United States Patent
Argo et al.

(10) Patent No.: US 7,738,271 B1
(45) Date of Patent: Jun. 15, 2010

(54) CONTROLLED RESONANT CHARGE TRANSFER DEVICE

(75) Inventors: Peter Hall Argo, Woodbridge, VA (US); Mark Jon Blackwelder, Sr., Warrenton, VA (US); Charles Allen Lors, Palm Beach Gardens, FL (US); Ronald W. Scott, Palm Beach Gardens, FL (US)

(73) Assignee: Science Applications International Corporation, San Diego, CA (US)

( * ) Notice: Subject to any disclaimer, the term of this patent is extended or adjusted under 35 U.S.C. 154(b) by 515 days.

(21) Appl. No.: 11/808,421

(22) Filed: Jun. 8, 2007

(51) Int. Cl.
    *H02M 3/18* (2006.01)
(52) U.S. Cl. ......................................................... 363/60
(58) Field of Classification Search .............. 363/21.02, 363/21.03, 39, 59, 60, 61, 62; 323/288; 307/108, 109
    See application file for complete search history.

(56) References Cited

U.S. PATENT DOCUMENTS

| | | | |
|---|---|---|---|
| 4,419,666 A | 12/1983 | Gurr et al. ............. 340/825.06 |
| 4,523,269 A | 6/1985 | Baker et al. .................. 363/138 |
| 4,587,604 A * | 5/1986 | Nerone ......................... 363/17 |
| 4,646,220 A | 2/1987 | Dao ............................. 363/28 |
| 4,648,017 A | 3/1987 | Nerone ......................... 363/28 |
| 4,691,273 A * | 9/1987 | Kuwata et al. .............. 363/132 |
| 4,872,101 A | 10/1989 | Mirow ......................... 363/49 |
| 5,262,931 A | 11/1993 | Vingsbo ...................... 363/16 |
| 5,267,138 A | 11/1993 | Shores ......................... 363/98 |
| 5,357,419 A | 10/1994 | Limpaecher ................ 363/140 |
| 5,475,296 A | 12/1995 | Vinsant et al. .............. 323/223 |
| 5,483,142 A | 1/1996 | Skibinski et al. ............... 320/1 |
| 5,731,965 A | 3/1998 | Cheng et al. .................. 363/41 |
| 5,852,558 A | 12/1998 | Julian et al. ................. 363/132 |
| 6,069,804 A | 5/2000 | Ingman et al. ................. 363/21 |
| 6,118,678 A * | 9/2000 | Limpaecher et al. .......... 363/60 |
| 6,400,581 B1 | 6/2002 | Lee .......................... 363/21.01 |
| 6,404,655 B1 | 6/2002 | Welches ...................... 363/41 |
| 6,426,883 B1 | 7/2002 | Stanley ....................... 363/16 |
| 6,567,283 B2 | 5/2003 | Welches ...................... 363/89 |
| 6,608,767 B1 | 8/2003 | Stanley ....................... 363/16 |

(Continued)

OTHER PUBLICATIONS

Gandhi, M., et al., "Performance of a DSP Based Phase-Shifted PWM Controlled, Zero-Voltage-Switching Direct-Current Regulated Magnet Power Supply," *IEEE Power India Conference*, 2006, 8 pp., Apr. 2006.

(Continued)

*Primary Examiner*—Adolf Berhane
(74) *Attorney, Agent, or Firm*—King & Spalding LLP

(57) ABSTRACT

Methods and devices for achieving a desired output in a resonant charge transfer device are given. In an exemplary embodiment a controlled resonant charge transfer device comprises first and second filter sections, first and second switch sections, a charge storage device, and a feedback control system. A method for controlling this device is given, the method comprising specifying a desired output and a desired charge storage voltage ratio; turning on first switches at first switch times and second switches at second switch times; measuring an actual output of the device and one or more parameters of the resonant circuit; determining an actual charge storage voltage ratio; computing corrected first switch times and corrected second switch times; on a subsequent operation cycle of the resonant charge transfer device, turning on the first switches at the corrected first switch times and the second switches at the corrected second switch times.

10 Claims, 6 Drawing Sheets

High Level Illustration of Control System for Resonant Charge Transfer Circuit

U.S. PATENT DOCUMENTS

| | | | |
|---|---|---|---|
| 6,674,379 B1 | 1/2004 | Li et al. | 341/123 |
| 6,731,524 B2 | 5/2004 | Elek et al. | 363/70 |
| 6,853,561 B2 | 2/2005 | Elek et al. | 363/17 |
| 6,862,198 B2 | 3/2005 | Muegge et al. | 363/21.11 |
| 6,900,995 B2 | 5/2005 | Muegge et al. | 363/21.05 |
| 7,092,265 B2 | 8/2006 | Kernahan | 363/65 |
| 7,402,983 B2 * | 7/2008 | Jacobson et al. | 323/214 |
| 7,599,196 B2 * | 10/2009 | Alexander | 363/13 |
| 2005/0162142 A1 | 7/2005 | Kernahan et al. | 323/283 |
| 2005/0169017 A1 | 8/2005 | Muegge et al. | 363/21.15 |
| 2005/0265058 A1 | 12/2005 | Stevanovic et al. | 363/131 |
| 2006/0176034 A1 | 8/2006 | Skinner | 323/282 |
| 2006/0193153 A1 | 8/2006 | Erdl et al. | 363/16 |
| 2006/0238183 A1 | 10/2006 | DeVries, Jr. et al. | 323/288 |
| 2006/0262576 A1 | 11/2006 | Przybyla et al. | 363/21.02 |
| 2007/0008745 A1 | 1/2007 | Joshi et al. | 363/21.01 |
| 2008/0031019 A1 * | 2/2008 | Alexander | 363/37 |

OTHER PUBLICATIONS

Mihalache, L., "A High Performance DSP Controller for Three-Phase PWM Rectifiers With Ultra Low Input Current THD Under Unbalanced and Distorted Input Voltage," *Fortieth IAS Annual Meeting Conference Record, Industry Applications Conference*, 2005, vol. 1, pp. 138-144 (Plus Abstract—1 p.), Oct. 2-6, 2005.

Caldwell, D., "Power Goes Digital: Designers Lack Simple Tools to Squeeze Performance Out of Microcontrollers in Power Converters. Easy-to-Understand Guidelines Can Help Designers Take Advantage of Analog Knowledge to Ease the Transition Into Digital Control for Power Designs (Analog to Digital Converters)," *EDN*, vol. 50, Issue 17, 7 pp., Aug. 18, 2005.

Liu, Zhichao, et al., "Implementation of DSP-Based Three-Level Inverter With Dead Time Compensation," *The 4$^{th}$ International Power Electronics and Motion Control Conference, IPEMC 2004*, vol. 2, pp. 782-787 (Plus Abstract—1 p.), Aug. 14-16, 2004.

Li, Qiao, et al., "Design of Parallel Resonant DC-Link Soft-Switching Inverter Based on DSP," *Proceedings of the 5$^{th}$ World Congress on Intelligent Control and Automation*, Hangshou, P. R. China, pp. 5595-5599, Jun. 15-19, 2004.

Guldner, H., et al., "Compact DSP Application for a 100kW DC Power Supply," *IEEE 34$^{th}$ Annual Power Electronics Specialist Conference, PESC '03*, 2003, vol. 1., pp. 341-344 (Plus Abstract—1 p.), Jun. 15-19, 2003.

Hattrup, Christian, et al., "Fast Estimation Techniques for Digital Control of Resonant Converters," *IEEE Transactions on Power Electronics*, vol. 18, No. 1, pp. 365-372, Jan. 2003.

Xu, Jianping, et al., "A Unified Averaging Technique for the Modeling of Quasi-Resonant Converters," *IEEE Transactions on Power Electronics*, vol. 13, No. 3, pp. 556-563, May 1998.

Chickamenahalli, S. A., et al., "A High-Performance DSP Controlled Resonant-Commutated Converter," *Thirteenth Annual Applied Power Electronics Conference and Exposition, APEC '98 Conference Proceedings 1998*, vol. 1, pp. 329-334 (Plus Abstract—1 p.), Feb. 15-19, 1998.

du Toit, J. A., et al., "A DSP Based Controller for Back to Back Power Electronic Converters With FPGA Integration," *Twelfth Annual Applied Power Electronics Conference and Exposition, APEC '97 Conference Proceedings 1997*, vol. 2, pp. 699-705, Feb. 1997.

Zwillinger, Daniel, "CRC Standard Mathematical Tables and Formulae, 30$^{th}$ Edition" CRC Press, New York, 45 pp., Copyright 1996.

Tan, F. Dong, et al., "A Unified Model for Current-Programmed Converters," *IEEE Transactions on Power Electronics*, vol. 10, No. 4, pp. 397-408, Jul. 1995.

Stengel, Robert F., "Optimal Control and Estimation," Dover Publications, Inc., New York, 20 pp., Copyright 1994.

Middlebrook, R. D., "Modeling Current-Programmed Buck and Boost Regulators," *IEEE Transactions on Power Electronics*, vol. 4, No. 1, pp. 36-52, Jan. 1989.

* cited by examiner

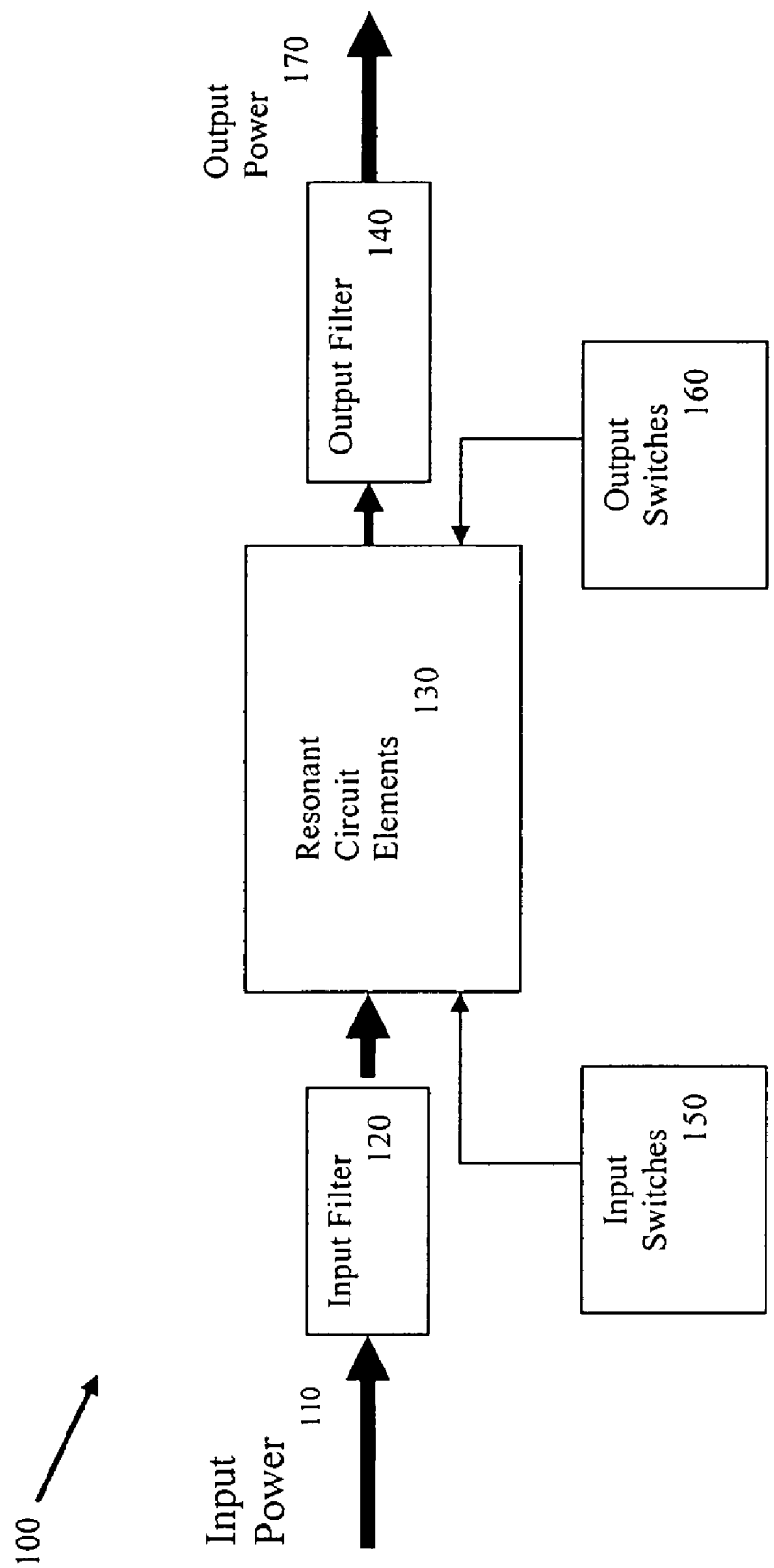
Figure 1. Basic Resonant Charge Transfer Circuit – Prior

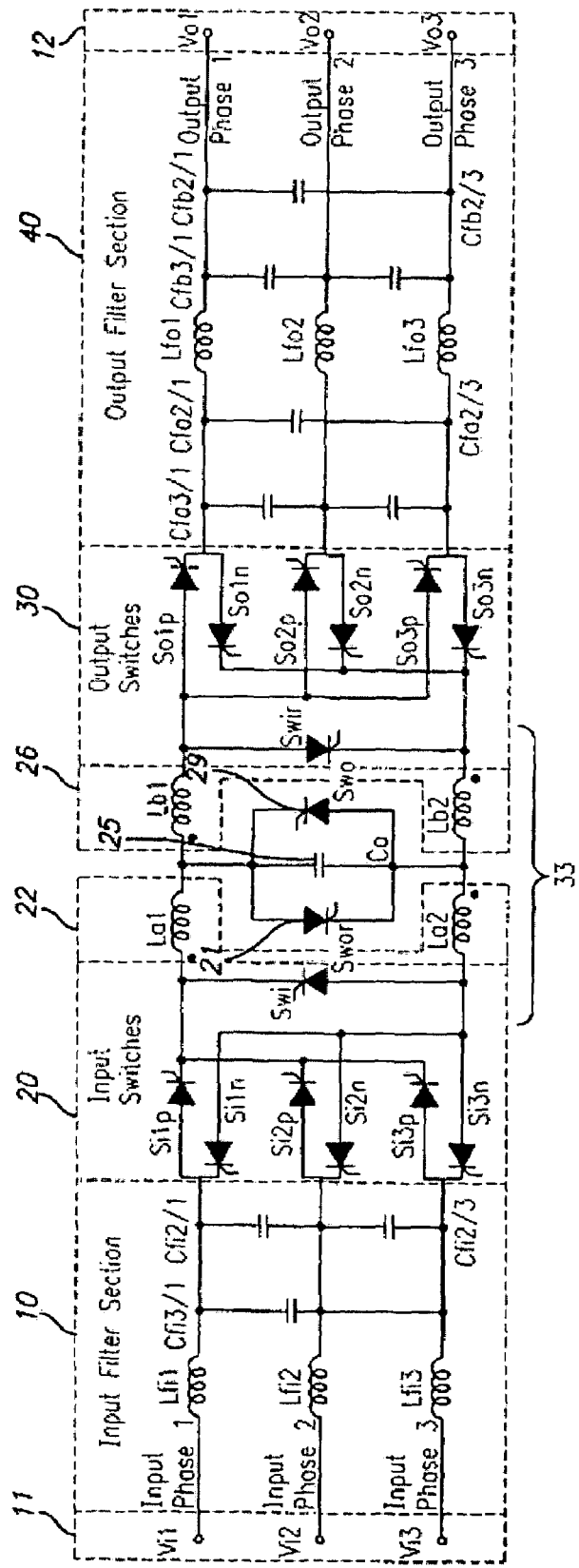
Figure 2. Prior Art Resonant Charge Transfer Device

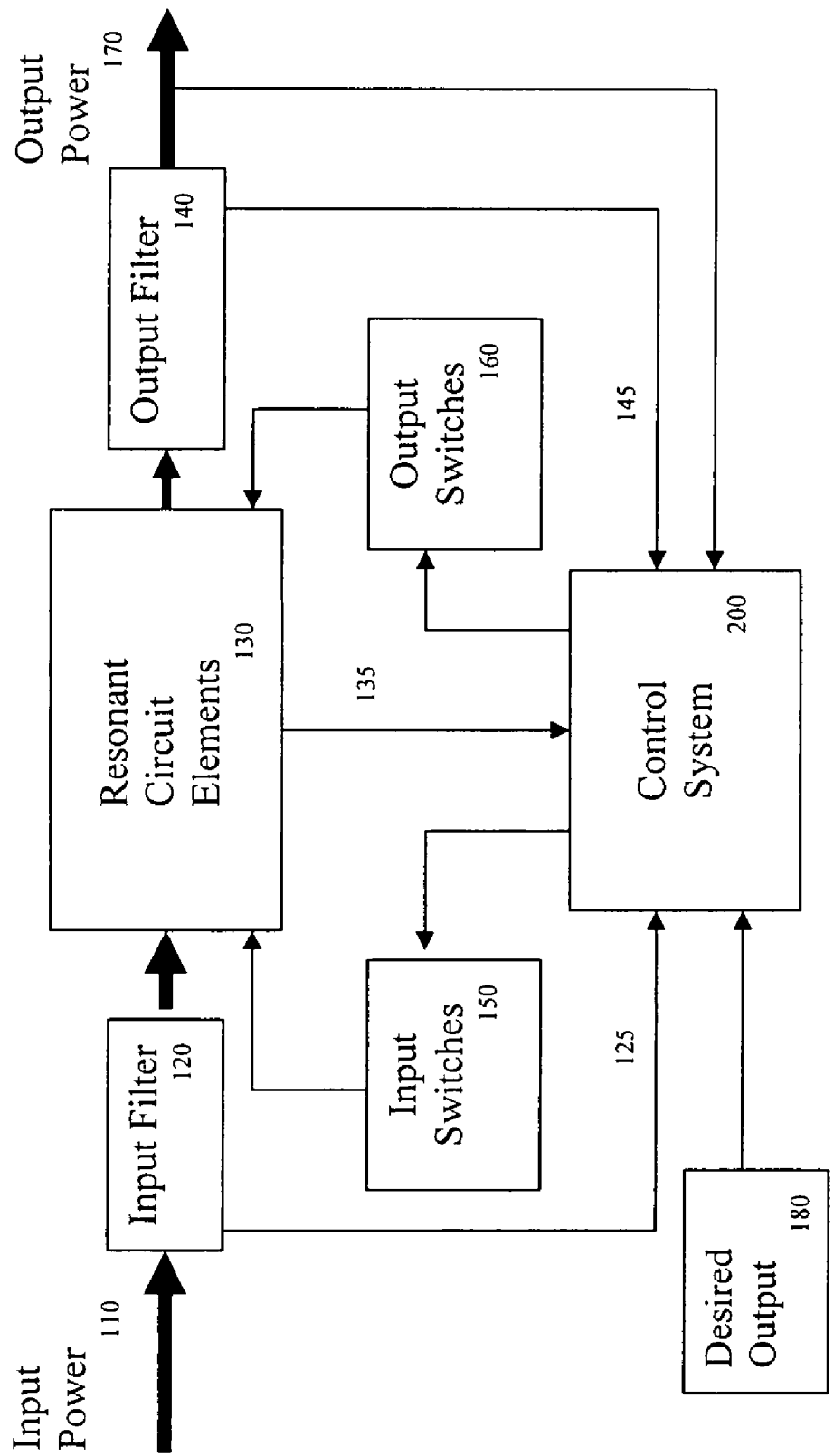
Figure 3. Basic Resonant Charge Transfer Circuit with Feedback

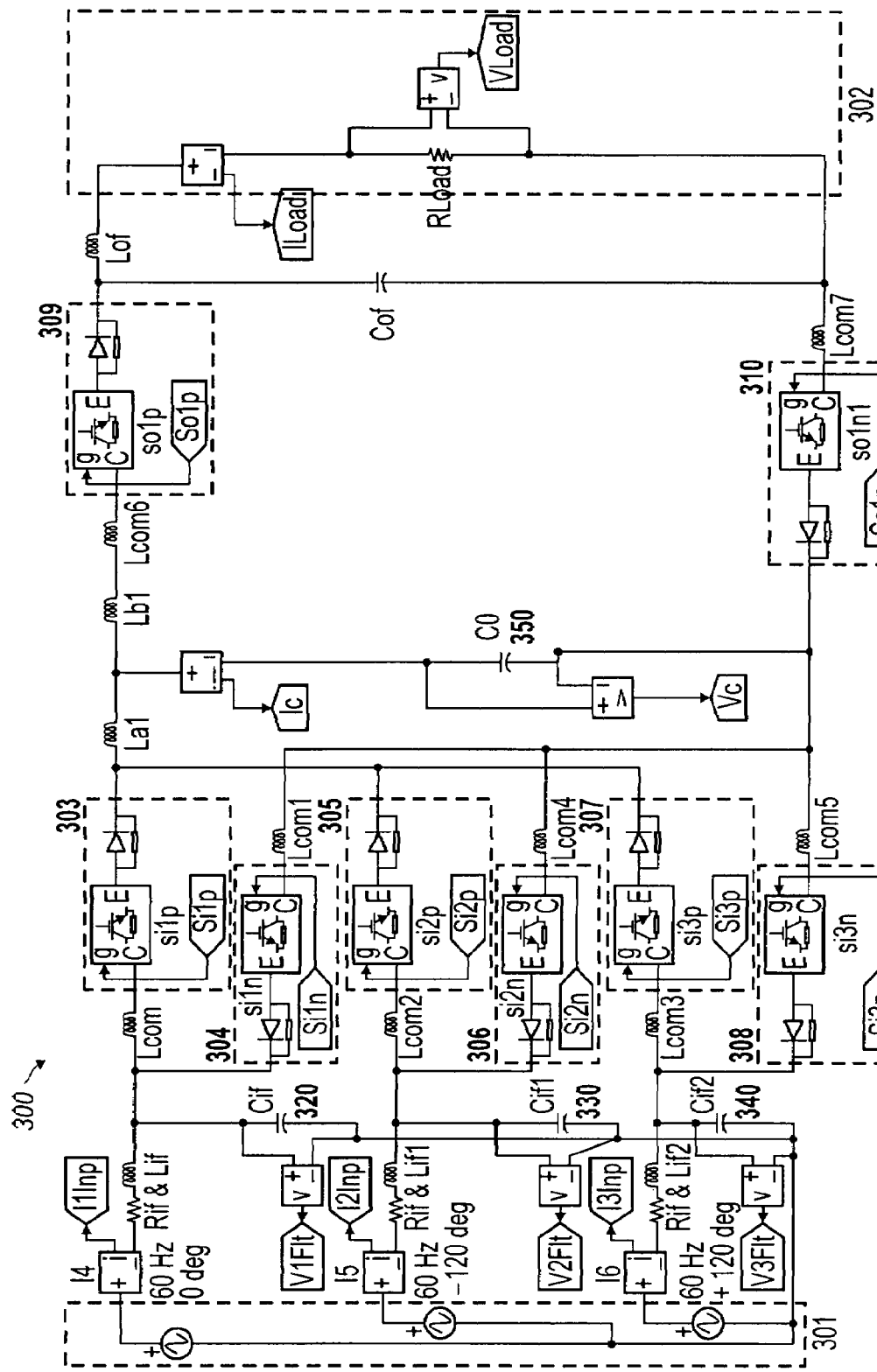
Figure 4: Resonant Charge Transfer Device to be Controlled in Accordance with One Embodiment of Present Invention

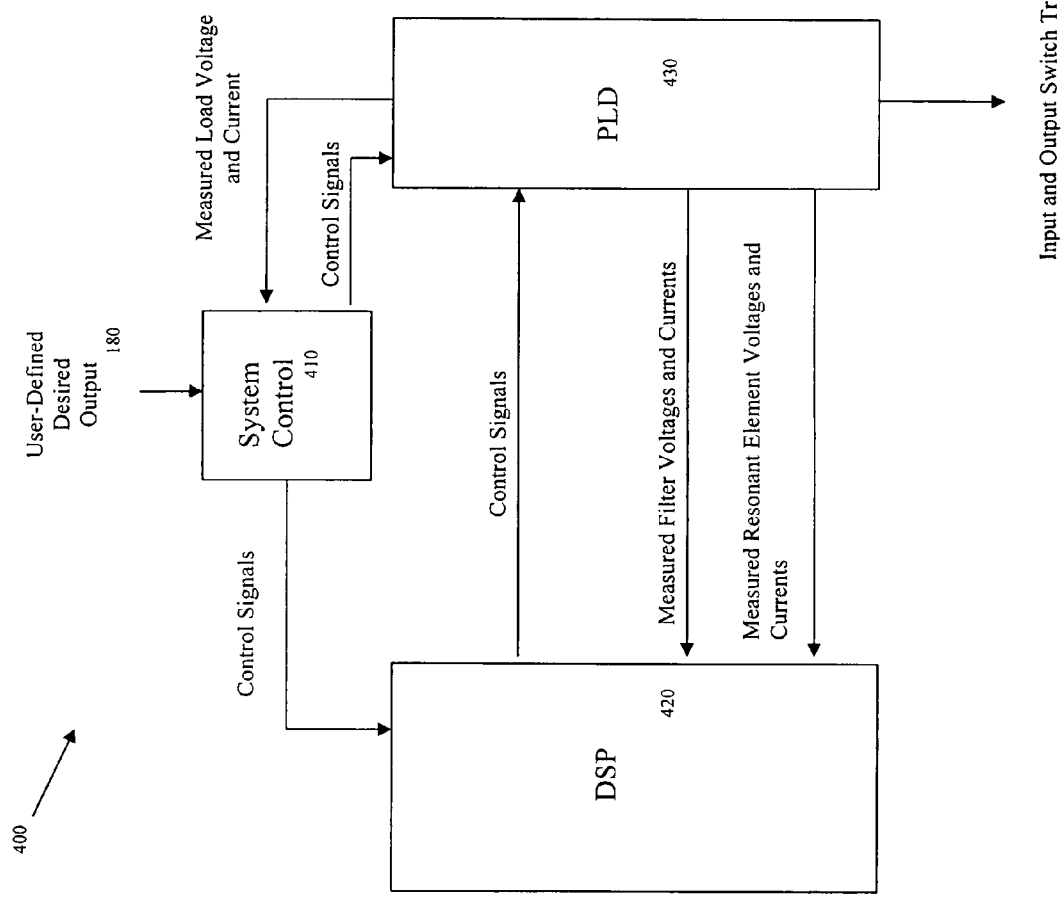
Figure 5. High Level Illustration of Control System for Resonant Charge Transfer Circuit

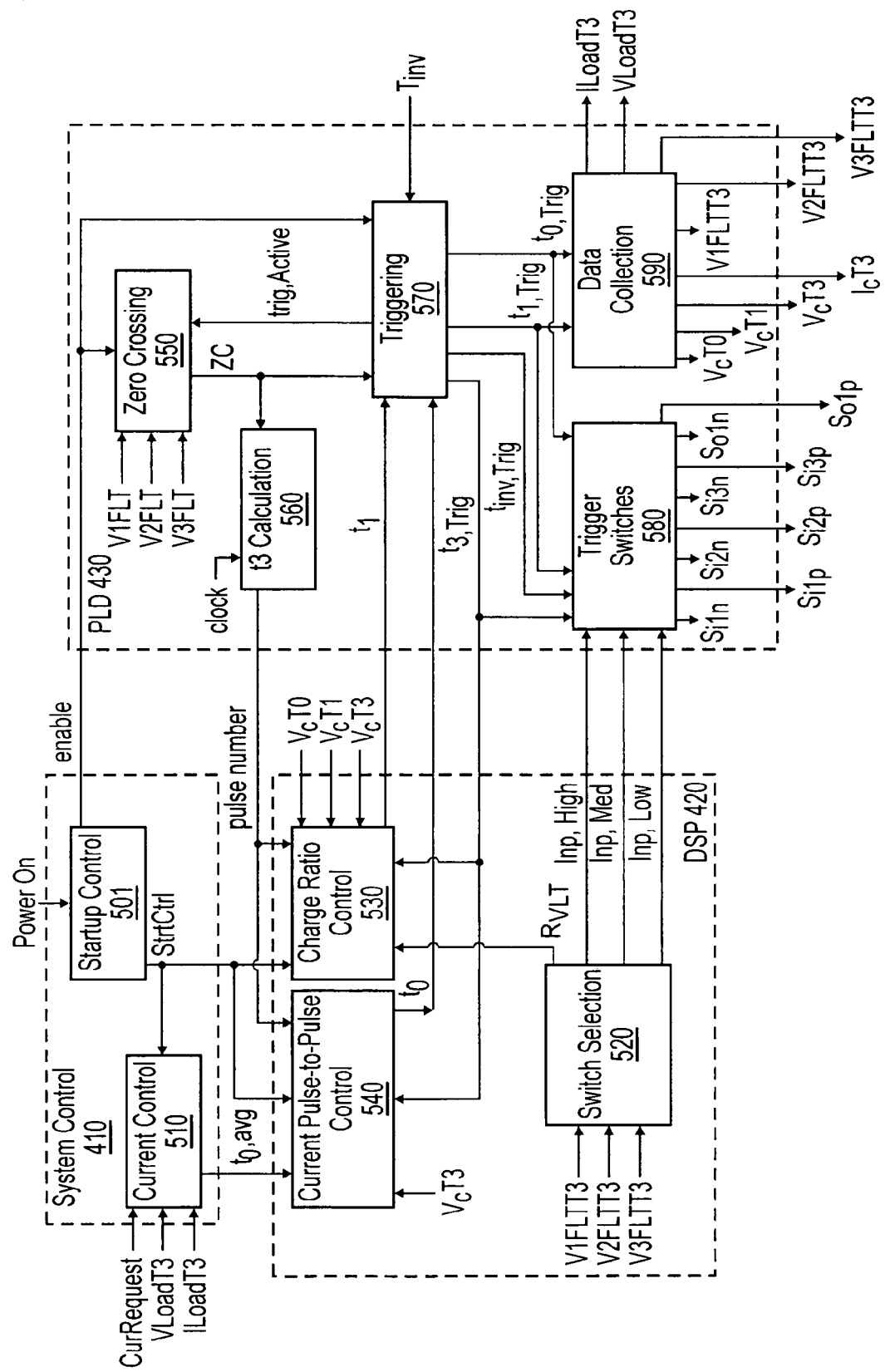
Figure 6: Exemplary Embodiment of Control System

CONTROLLED RESONANT CHARGE TRANSFER DEVICE

BACKGROUND OF THE INVENTION

1. Field of the Invention

This invention relates to electric power conversion, and more particularly relates to methods and devices for controlled power conversion through a resonant charge transfer device.

2. Description of Related Art

Resonant charge transfer devices may be used to formulate a desired output waveform from a given waveform input at the terminals of, for example, a three-phase power device. Generally they operate by transferring a predetermined amount of charge between the various phases of the input terminal and a charge storage device, such as a capacitor, and then, after suitable transfer of charge has occurred, transferring a predetermined amount of charge between the charge storage device and the output terminals. Generally the transfer of charge is mediated through the opening and closing of switches, the operation of which results in a sequential transfer of charge from the various phase inputs of the three-phase input to the charge storage device and then from the charge transfer device to the output. It is known how to predetermine the amount of charge that must be transferred and the precise sequence for doing so to achieve a wide variety of transformations of input power to a desired output power.

FIG. 1 illustrates a functional overview of the operation of a prior art resonant charge transfer device 100. In particular, in converting input AC power 110 to output DC power 170, for example, the circuit generally operates by passing the input power 110 through a stage of input filtering 120, after which charge is transferred to the resonant circuit 130. The amount of charge that is transferred to the resonant circuit 130 is determined by the opening and closing times of input switches 150. In particular, the input switches 150 open and close at predetermined times in accordance with a desired output power to be achieved by the circuit 100. Upon the closing of the input switches 150 after charge has been transferred to the resonant circuit 130, the charge is subsequently permitted to discharge into an output filter stage 140. The manner in which this discharge occurs is determined by the opening and closing of output switches 160. In particular, the output switches 160 open and close at predetermined times in accordance with a desired output to be achieved by the circuit 100. It is known within the prior art how to ascertain the opening and closing times of the input switches 150 and output switches 160 to achieve a desired output power for a given input voltage 110 and output voltage 170.

U.S. Pat. No. 6,118,678, "Charge Transfer Apparatus and Method Therefore," which is incorporated by reference herein for all purposes, teaches examples of this kind of resonant circuit topology. For example, FIG. 2, taken from U.S. Pat. No. 6,118,678, illustrates a resonant charge transfer device within input terminals 11, an input filter section 10, input switches 20, resonant circuit elements 22,25,26, output switches 30, output filter section 40, and output terminals 12. As taught therein, turning on the switches at predetermined times and operating them so that they self-commutate leads to a wide variety of circuit applications, including but not limited to AC-to-DC rectifier, AC-to-AC power conversion, and DC-to-AC power conversion.

The opening and closing times of the input switches 150 and output switches 160 to achieve a desired output power for a given input power source 110 are a function of the parameters defining the input filter stage 120, the resonant circuit elements 130, and the output filter stage 140. In any particular implementation, however, the parameters of the actual elements comprising the input filter stage 120, resonant circuit elements 130, and output filter stage 140 will deviate from their nominally given values as a function of various factors such as, for example, temperature, operating point, etc. Because the actual parameter values in any particular implementation differ from their nominal values, use of predetermined opening/closing times of the input and output switches 150, 160 will not lead to the precise desired output power; the actual output power 170 will differ from the desired power in some unknown fashion that will vary as the actual parameters differ with temperature, operating point, etc. Hence, a need arises to develop feedback control strategies that actively monitor the operating values of the various circuit parameters as well as the circuit's operating point and control the switching times to achieve the desired output.

SUMMARY OF THE INVENTION

Summary of the Problem

Several military as well as commercial applications need high density, lightweight AC and DC power supplies and converters that can provide multiple outputs from a given input or can provide power balancing from multiple sources. These applications include supplying shipboard power as well as supplying commercial grid utility power and power in commercial small production settings. One approach as discussed above is to implement a resonant soft-switching circuit topology. This circuit topology provides benefits such as reduced component count (which results in lower cost), elimination of switching issues (which results in improved efficiency), and enabling of high speed operation at high power levels. However, on-the-fly monitoring of and adjustment to source and load transients is required to permit power sources to re-configure power flows in response to rapidly changing demands. This monitoring and adjustment can be achieved through use of a controlled resonant circuit topology in which a control system as disclosed herein calculates and/or controls voltage and current levels, switching timing, and system parameters within the soft-switching resonant circuit topology.

Summary of the Solution

Methods and devices for transferring charge to achieve a desired output in a resonant charge transfer device are given. In an exemplary embodiment a resonant charge transfer device comprises a first filter section, a first switch section, a charge storage device, a second switch section, and a second filter section, and a method for controlling this device is given, the method comprising specifying a desired output; specifying a desired charge storage voltage ratio; determining one or more first switch times at which one or more first switches will turn on; turning on the first switches at the first switch times; determining one or more second switch times at which one or more second switches will turn on; turning on the second switches at the second switch times; measuring an actual output of the device; measuring at one or more specific times one or more parameters associated with each of the first filter section, and the charge storage section; computing an actual charge storage voltage ratio from the measured charge storage section parameters; comparing the desired output to the actual output and the desired charge storage voltage ratio to the actual charge storage voltage ratio to formulate an output correction parameter; utilizing the measured first filter parameters, the measured charge storage section parameters, and the output correction parameter to compute one or more corrected first switch times; utilizing the measured first filter parameters, the measured charge storage section parameters, and the output correction parameter to compute one or more corrected second switch times; on a subsequent operation cycle of the resonant charge transfer device, turning on the one or more first switches at the corrected first switch times; and on a subsequent operation cycle of the resonant charge transfer device, turning on the second switches at the corrected second switch times.

A further exemplary embodiment describes a charge transfer device comprising: a first filter section, a first switch section, a charge storage device, a second switch section, a second filter section, a feedback control unit configured to operate the first switch section and the second switch so as to achieve a desired output.

And a still further exemplary embodiment describes a method for controlling a charge transfer device comprising: (i) inputting a desired output current value to a control system of the charge transfer device; (ii) inputting an actual output current value to the control system; (iii) inputting control parameters for controlling an input filter, resonant circuit element and output filter into the control system; (iv) determining switching parameters for input and output switches based on the control parameters, desired output current value and actual output current value; and (v) switching the input and output switches in accordance with the switching parameters to achieve the desired output value.

BRIEF DESCRIPTION OF THE SEVERAL VIEWS OF THE DRAWING

Other objects, features, and advantages of the present invention will become more apparent from the following detailed description of the preferred embodiment and certain modifications thereof when taken together with the accompanying drawings in which:

FIG. 1 illustrates an overview functional illustration of a prior art resonant charge transfer device without control;

FIG. 2 illustrates a prior art resonant circuit structure;

FIG. 3 illustrates an overview functional illustration of a controlled resonant charge transfer device in accordance with an exemplary embodiment of the present invention;

FIG. 4 illustrates an exemplary embodiment of a resonant charge transfer device that may be controlled in accordance with the present invention;

FIG. 5 illustrates an exemplary embodiment of a control system adapted for controlling the operation of a resonant charge transfer device; and FIG. 6 illustrates a more detailed functional overview of a control system illustrated in FIG. 5.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

To achieve the precisely desired output power in any particular implementation of a charge transfer device such as that exemplified in FIGS. 1 and 2, one may control the circuit using feedback, as illustrated in FIG. 3, which shows a functional illustration of a control circuit in accordance with one embodiment of the invention. In this feedback approach, the actual output current 170 along with a desired output current 180 are input into a control system 200. In addition, various input filter parameters 125, resonant circuit element parameters 135, and output filter parameters 145 are also input to the control system 200, which then ascertains the opening/closing times of the input and output switches 150, 160.

FIG. 4 illustrates a resonant charge transfer device circuit 300 with a three phase AC input terminal 301 for receiving a three-phase AC power supply 110 (from FIGS. 1 and 3) and a two phase output terminal 302 for supplying DC power 170 (from FIGS. 1 and 3) as an output. In this particular embodiment, this resonant charge transfer device comprises six input switch assemblies 303, 304, 305, 306, 307, 308 (which correspond to input switches 150 as shown on FIGS. 1 and 3) and two output switch assemblies 309, 310 (which correspond to output switches 160 as shown on FIGS. 1 and 3). The switch assemblies comprise Insulated Gate Bipolar Transistor ("IGBT") switches coupled to diodes. This arrangement permits the switches to self-commute and eliminates the need to turn the switches off actively. This circuit further comprises three input filter 120 (from FIGS. 1 and 3) capacitors 320, 330, 340 and one central capacitor 350. The central capacitor 350 corresponds to the resonant portion 130 of the resonant charge transfer device 100 (from FIGS. 1 and 3).

The operation of this circuit may be controlled via a feedback controller, an exemplary embodiment of which is illustrated in FIG. 5. As shown in FIG. 5, a feedback controller 400 according to one embodiment of the present utilizes a system controller 410 to initiate operation of a digital signal processor 420 ("DSP") working in conjunction with a programmable logic device 430 ("PLD") to monitor and control the operation of the circuit 300 illustrated in FIG. 4.

More particularly as shown in the functional illustration in FIG. 6, the system controller 410 comprises the functional operations of startup 501 and current control 510; the DSP 420 comprises the functional operations of switch selection 520, charge ratio control 530, and current pulse-to-pulse control 540, whereas the PLD 430 comprises the functional operations of zero crossing detection 550, $t_3$ calculation 560, triggering 570, trigger switches 580, and data collection 590. Each of these functionalities in turn will be discussed in further detail for an exemplary embodiment.

Startup controller 410 takes as input a user-supplied power on command. Once the command has been received, an enable command to initiate operation of various processes of the PLD 430 is activated after a suitable delay, where the amount of delay may be supplied as a parameter. An exemplary range of values for this delay is 10-100 milliseconds. Once the enable command is activated, a start control ("StrtCtrl") command to initiate operation of various processes of the DSP is activated after a suitable delay, which also may be supplied as a parameter. An exemplary range of values for this delay is 10-100 milliseconds. The output of the system controller is the activated enable and StrtCtrl commands.

Current control process 510 takes as input a reference current level supplied by the user ("CurRequest"). In this exemplary embodiment CurRequest is the DC output signal desired by the user. It also takes as inputs the output voltage sampled at a particular time $t_3$ ("VLoadT3") and the similarly sampled output current (ILoadT3"). This process requires that StrtCtrl be activated. The process operates by first filtering the sample load current according to the following algorithm to obtain an average load current ILoadFlt:

ILoadFlt(k)=ccf1*ILoadFlt(k−1)+ccf2*ILoad(k)

Where "k" is the value of the present time step, "k−1" is the value of the previous time step, and "ccf1", "ccf2" are smoothing coefficients the values of which are functions of the DSP sample period $t_{sDSP}$ which is a parameter of the actual DSP used. The algorithm will be updated at a desired clock pulse rate, for example 20,160 Hz. One of ordinary skill in the art will recognize that other choices for the update rate are possible. In addition, an exemplary choice for ccf1 and ccf2 is ccf1=exp(−$t_{sDSP}$/0.005)

ccf2=1−exp(−$t_{sDSP}$/0.005).

One of ordinary skill in the art will recognize that other choices are available. The current error may then be computed by subtracting the filtered load current ILoadFLT from the reference load current CurRequest. Applying the error to an integrator with a given loop gain ("ContGain") (not shown on Figure) then allows the mean trigger time $t_{0,avg}$ to be ramped up or down to adjust the output current. One of ordinary skill in the art will recognize that ContGain is a design parameter. For this exemplary embodiment, a suitable value for ContGain is approximately 600 microseconds per ampere. The output of this current control process 510 is $t_{0,avg}$, the average time $t_0$ with respect to the previous $t_3$ timing event, which will be discussed in further detail below.

Switch selection process 520 determines which input switches 150 (From FIGS. 1 and 3) to fire. In particular, at time $t_0$ the switches associated with the high and low absolute value phase voltages are fired. At time $t_1$ the medium phase voltage switch is fired. Accordingly switch selection process 520 takes as its input phase filter voltages 110 (from FIGS. 1 and 3) sampled at time $t_3$ ("V1FltT3, V2FltT3, V3FltT3") and calculates the absolute values of the three input phase voltages. It then sorts these absolute values by magnitude, and computes a corresponding switch number for each of the high, medium, and low voltages. In particular, given the sort order n of the absolute value of the input phase voltages, the switch number is 2*n for a negative phase voltage and 2*n−1 for a positive phase voltage. In addition, this switch selection process 520 also computes a voltage ratio ("$R_{vlt}$") computed by dividing the low input voltage by the medium input voltage. This process 520 then outputs the switch numbers inpHigh, inpMed, and inpLow as well as $R_{vlt}$.

Charge ratio control process 530 adjusts the $t_1$ trigger time to cause the input charge ratio to track the voltage ratio $R_{vlt}$. In particular, the charge accumulated by the resonant capacitor 350 is the integral of the charge current, which is proportional to the capacitor voltage. Thus if the capacitor voltage is stored at the trigger times $t_0$, $t_1$, and $t_3$, then the charge ratio can be calculated as (VcT1−VcT0)/(VcT3−VcT0). If this ratio is larger than the charge ratio $R_{vlt}$ by a sufficient amount, which in an exemplary embodiment is 0.1, then the time $t_1$ is decreased by a fixed amount, which in one embodiment is 0.05 microseconds. If the ratio is smaller than the charge ratio $R_{vlt}$ by a sufficient amount, which in an exemplary embodiment is 0.1, then the time $t_1$ is increased by a fixed amount, which in an exemplary embodiment is 0.05 microseconds. This approach results in fixed increment integral tracking control. One of ordinary skill in the art will recognize that other approaches are available. Thus the charge ratio control process 530 takes as inputs $t_{3,trig}$, which is a trigger signal pulse from the PLD, the ratio $R_{vlt}$, the pulse number, and the central capacitor voltages sampled at times $t_0$, $t_1$, and $t_3$, ("VcT0, VcT1, VcT3") and then outputs $t_1$, a trigger time measured in counts with respect to the previous $t_3$ event, as well as the previous voltage ratio input signal ("$MR_{vlt}$") and the observed charge ratio ("$MR_{charge}$"), which may be used for diagnostic purposes. ($MR_{vlt}$ and $MR_{charge}$ are not shown in FIG. 5.)

Current pulse-to-pulse control process 540 calculates a $t_0$ offset for each pulse to minimize the output current distortion caused by the periodic three-phase modulation. This offset $t_{0,offset}$ (not shown on Figure) is computed to keep the resonant capacitor 350 voltage constant. It takes as inputs a trigger pulse $t_{3,Trig}$, the pulse number, the central capacitor 350 voltage VcT3 sampled at time $t_3$, and the average time $t_{0,avg}$ and outputs a trigger time $t_0$ in counts with respect to the previous $t_3$ event. In particular, the process computes the average central capacitor voltage $V_{c,mean}$. Based upon the pulse number, it computes the previous pulse number and from this previous pulse number retrieves the previous $t_{0,offset}$. It then computes the error in the central capacitor 350 voltage as the average voltage $V_{c,mean}$ minus the central capacitor 350 voltage sampled at time $t_3$, VcT3. If the error in the central capacitor 350 voltage is sufficiently large, then the previous $t_{0,offset}$ is decreased by a suitable amount, which in an exemplary embodiment is 0.05 microseconds. If the error is sufficiently small, then the previous $t_{0,offset}$ is increased by a suitable amount, which in an exemplary embodiment is 0.05 microseconds. The adjusted value is then stored for future use. This offset is then added to $t_{0,average}$ to obtain a new value for $t_0$. It may be desirable in some applications to ensure that the value of $t_0$ is bounded.

The zero crossing detection process 550 within the PLD establishes the base timing for the resonant pulse train. Each pulse is triggered based on its time from the start of an input phase voltage sinusoidal period. In particular, this process 550 takes as inputs the input phase filter capacitor 320, 330, 340 voltages ("V1Flt, V2Flt, V3Flt") and a trigger trigActive which is an indicator for which half of the energy transfer is active and outputs the occurrence of an input phase 1 filter capacitor voltage zero crossing event ("ZC"). This process 550 works by detecting a positive edge crossing of the phase 1 input voltage signal through zero, debouncing the detected signal to insure a consistent edge, and estimating the actual zero crossing based on the detected and de-bounced zero crossings combined with the expected period of the zero crossing event ZC.

The $t_3$ calculation process 560 takes as input the occurrence of the zero crossing event ZC and an input clock signal and outputs the present $t_3$ timing value referenced to the previous $t_3$ value. It also outputs a pulse number, which is an index to the present pulse. It accomplishes this by computing a local time as the time from the previous zero crossing event and, when a zero crossing event is detected, resetting the pulse number counter to 1. Each time the local time then passes a $t_3$ event time, the pulse number counter is incremented.

The triggering process 570 takes as inputs the occurrence of a zero crossing event ZC and trigger times $t_0$, $t_1$, and $t_3$ as well as a trigger $t_{inv}$ and returns various triggers, $t_{0\,Trig}$, $t_{1Trig}$, $t_{3Trig}$, $t_{invTrig}$, and trigActive that are utilized in various other aspects of the controller operation. For an exemplary embodiment, $t_{inv}$ may be set to a constant of 17 microseconds, although one of ordinary skill in the art will recognize that other choices are possible. Once a zero crossing signal is detected (after the enable signal is applied), the process 570 provides a clock signal to all counters. On each zero crossing it resets the master local counter, which runs for 360 electrical degrees. When the master local counter exceeds the input value for $t_3$, the process 570 sets the $t_{3Trig}$ output, holds the $t_{3Trig}$ output for a given count (the "$t_{3Trig}$ persistence period"), and at the end of the $t_{3Trig}$ persistence period resets the $t_{3Trig}$ output. In an exemplary embodiment, this persistence period along with other persistence periods discussed herein are on the order of 500 microseconds. One of ordinary skill in the art will recognize that other choices are possible. It also resets the $t_3$ counter. When the $t_3$ counter exceeds the input value for the process sets the $t_{invTrig}$ output, holds the $t_{invTrig}$ output for a given count (the "$t_{invTrig}$ persistence period"), and at the end of the $t_{invTrig}$ persistence period resets the $t_{invTrig}$ output. It also resets the $t_{inv}$ counter. When the $t_{inv}$ counter exceeds the input value for $t_0$, the process sets the $t_{0Trig}$ output, holds the $t_{0Trig}$ output for a given count (the "$t_{0Trig}$ persistence period"), and at the end of the $t_{0Trig}$ persistence period resets the $t_{0Trig}$ output. It also resets the $t_0$ counter. When the $t_0$ counter exceeds the input value for $t_1$, the process sets the $t_{1Trig}$ output, holds the $t_{1Trig}$ output for a given count (the "$t_{1Trig}$ persistence period"), and at the end of the $t_{1Trig}$ persistence period resets the $t_{1Trig}$ output. It also resets the $t_1$ counter. When $t_{3Trig}$ events are detected, the TriggerActive counter is incremented.

Trigger switches process 580 computes the times at which the input switches 150 and output switches 160 fire (from FIGS. 1 and 3). It takes as inputs various triggers $t_{0Trig}$, $t_{1Trig}$, $t_{3Trig}$, $t_{invTrig}$ and the switch numbers inpHigh, inpMed, and inpLow for the high, medium, and low input switches and outputs the input phase 1 gate trigger signals, Si1$p$, Si1$n$ (positive and negative), the input phase 2 gate trigger signals Si2$p$, Si2$n$, the input phase 3 gate trigger signals Si3$p$, Si3$n$, and the output phase 1 gate trigger signals So1$p$, So1$n$. When a $t_3$ event is detected, the process 580 sets a $t_{3TriggerLatch}$, which is then used to reset the $t_{1TriggerLatch}$. When a $t_1$ event is detected, the process 580 sets a $t_{1TriggerLatch}$, which is then used to reset the $t_{1TriggerLatch}$. When a $t_{invTrig}$ event is detected, the process 580 sets a $t_{invTriggerLatch}$. When either the $t_{1TriggerLatch}$ or the $t_{0TriggerLatch}$ is set, the high switch trigger vector sHigh is defined, based upon the inpHigh count value. When the $t_{0TriggerLatch}$ is set, the low switch trigger vector sLow is defined, based upon the inpLow count value. When the $t_{1TriggerLatch}$ is set, the medium switch trigger vector sMed is defined based upon the inpMed count value. When the $t_{invTriggerLatch}$ is set, the inversion switch trigger vector sInv is defined, based upon the inpHigh value. The input switch command vector Si is then formed as the bitwise OR of sHigh, sLow, sMed, and sInv.

Finally data collection process 590 samples the central capacitor 350 voltage and current, the phase 1, 2, and 3 filter capacitor voltages and the output voltage load and currents appropriately at times $t_0$, $t_1$, and $t_3$ to supply VcT0, VcT1, VcT3, IcT3, V1FltT3, V2FltT3, V3FltT3, VLoadT3 and ILoadT3 for use by other processes in this embodiment of the control circuit.

In an exemplary embodiment, control system 200 comprises an algorithm, software, and circuitry wherein the algorithm is embedded in software that resides on the circuit board. However, the disclosed methods may readily be implemented partially in software using object or object-oriented software development environments that provide portable source code that can be used on a variety of computer or workstation platforms. Alternatively, the disclosed system may be implemented partially or fully in hardware using standard logic circuits or, for example, a VLSI design. Whether software or hardware is used to implement the systems in accordance with this invention is dependent on the speed and/or efficiency requirements of the system, particular function, and the particular software or hardware systems or microprocessor or microcomputer systems being utilized. The systems and methods illustrated herein can be readily implemented in hardware and/or software using any suitable systems or structures, devices and/or software by those of ordinary skill in the applicable art from the functional description provided herein and with a basic general knowledge of the power conversion and control arts.

We claim:

1. A method of controlling the operation of a resonant charge transfer device comprising a first filter section, a first switch section, a charge storage device, a second switch section, and a second filter section, the method comprising:
    specifying a desired output;
    specifying a desired charge storage voltage ratio;
    determining one or more first switch times at which one or more first switches will turn on;
    turning on the first switches at the first switch times;
    determining one or more second switch times at which one or more second switches will turn on;
    turning on the second switches at the second switch times;
    measuring an actual output of the device;
    measuring at one or more specific times one or more parameters associated with each of the first filter section, and the charge storage section;
    computing an actual charge storage voltage ratio from the measured charge storage section parameters;
    comparing the desired output to the actual output and the desired charge storage voltage ratio to the actual charge storage voltage ratio to formulate an output correction parameter;
    utilizing the measured first filter parameters, the measured charge storage section parameters, and the output correction parameter to compute one or more corrected first switch times;
    utilizing the measured first filter parameters, the measured charge storage section parameters, and the output correction parameter to compute one or more corrected second switch times;
    on a subsequent operation cycle of the resonant charge transfer device, turning on the one or more first switches at the corrected first switch times; and
    on a subsequent operation cycle of the resonant charge transfer device, turning on the second switches at the corrected second switch times.

2. The method of claim 1 wherein the one or more corrected first switch times are computed to reduce the output correction parameter.

3. The method of claim 1 wherein the one or more corrected second switch times are computed to reduce the output correction parameter.

4. The method of claim 1 wherein computing one or more corrected switch times comprises incrementing or decrementing the switch time by a fixed amount.

5. A method for controlling a charge transfer device comprising:
    (i) inputting a desired output current value to a control system of the charge transfer device;
    (ii) inputting an actual output current value to the control system;
    (iii) inputting control parameters for controlling an input filter, resonant circuit element and output filter into the control system;
    (iv) determining switching parameters for input and output switches based on the control parameters, desired output current value and actual output current value; and (v) switching the input and output switches in accordance with the switching parameters to achieve the desired output value.

6. The method according to claim 5, further comprising sending the control parameters to a digital signal processor and a programmable logic device for determining the switching parameters.

7. The method according to claim 6, wherein determining switching parameters includes determining switching times for the input and output parameters at the digital signal processor and switching the input and output switches in accordance with the switching times includes triggering the input and output switches by the programmable logic device.

8. The method according to claim 5, wherein inputting control parameters for controlling the input filter, resonant circuit element and output filter includes inputting user selected control parameters and inputting measured control parameters.

9. The method according to claim 8, wherein the measured control parameters include measured input and output filter voltages and currents and measured resonant circuit element voltages and currents.

10. The method according to claim 5, further comprising continuously repeating steps (ii) through (v) to maintain the desired output current value.

* * * * *